United States Patent [19]
Cho

[11] Patent Number: 5,543,860
[45] Date of Patent: Aug. 6, 1996

[54] VIDEO SIGNAL PROCESSING CIRCUIT USING ADAPTIVE CONTROL

[75] Inventor: Hyun-Duk Cho, Suwon, Rep. of Korea

[73] Assignee: SamSung Electronics Co., Ltd., Suwon, Rep. of Korea

[21] Appl. No.: 523,575

[22] Filed: May 15, 1992

[30]     Foreign Application Priority Data

May 26, 1989 [KR] Rep. of Korea .................. 1989-7069

[51] Int. Cl.$^6$ ................................................ H04N 9/78
[52] U.S. Cl. ............................................................. 348/666
[58] Field of Search ............................................. 348/666

[56]                References Cited

U.S. PATENT DOCUMENTS

| 4,072,984 | 2/1978 | Kaiser | 358/31 |
|---|---|---|---|
| 4,090,221 | 5/1978 | Connor | 358/105 |
| 4,553,158 | 11/1985 | Acampora | 358/31 |
| 4,612,567 | 9/1986 | Pritchard | 358/31 |
| 4,617,589 | 10/1986 | Weckenbrock | 358/31 |
| 4,745,458 | 5/1988 | Hirano et al. | 358/140 |
| 4,847,682 | 7/1989 | Tsinberg et al. | 358/31 |

FOREIGN PATENT DOCUMENTS 176188  7/1989  Japan ........................... H04N 9/78

OTHER PUBLICATIONS

T. S. Robson et al, Extended–definition television service IEE Proc. vol. 129 PtA No. 7 Sep. 1982.
Fukinaki et al, NTSC–Full–Compatible Extended–Definition TV–Proto Model and Motion Adaptive Processing, IEEE Global Telecommunications Conference, Dec. 2–5 1985 4.6.2–4.6.5.
R. Storey HDTV Motion Adaptive Bandwidth Reduction Using, DATV, BBC RD 198615.

*Primary Examiner*—Donald T. Hajec
*Attorney, Agent, or Firm*—Robert E. Bushnell, Esq.

[57]            ABSTRACT

There is disclosed an adaptive controlling video signal processing circuit, wherein the motions of the composite video signal are sensed in a three dimension system of space-time so as to establish the bands to pass the chrominance signals and luminance signals. A space-time motion sensor receives the luminance signals to produce a space vertical motion sensing signal and a space horizontal motion sensing signal respectively as first and second sensing signals.

13 Claims, 4 Drawing Sheets

VIDEO SIGNAL PROCESSING CIRCUIT USING ADAPTIVE CONTROL

BACKGROUND OF THE INVENTION

This invention relates to a composite video signal processing circuit, and more particularly, to a circuit for adaptively controlling the composite video signals according to sensed space and time motion thereof.

A TV set or VCR for receiving a NTSC broadcast includes a circuit for separating the chrominance signal and luminance signal multiplexed in the NTSC signal. The reason for separating the chrominance signal and luminance signal from the composite video signal is well-known, thus not further explained. The conventional method for separating the chrominance signal (C) and luminance signal (Y) from the composite video signal employs a low pass filter and a band pass filter to pass signals of given frequency bands, or a comb filter. However, the method employing the above low pass and high pass filters can not precisely make the separation, while the method employing the comb filter causes some crosstalk.

SUMMARY OF THE INVENTION

It is an object of the present invention to provide an adaptive controlling video signal processing circuit, wherein the motions of the composite video signal are sensed in a three dimension system of space-time so as to establish bands to pass the chrominance signals and luminance signals.

It is another object of the present invention to provide a circuit for sensing the vertical and horizontal space-time motions of the composite video signal according to the luminance signal and frequency thereof.

It is still another object of the present invention to provide an adaptive control luminance filter and chrominance filter for respectively filtering the luminance signal and chrominance signal differently according to the vertical and horizontal motions.

According to the present invention, an adaptive controlling video signal processing circuit includes an analog to digital converter for converting an input composite video signal into digital signals, a comb filter for separating luminance signals and chrominance signals from the composite video signals output from the A/D converter, a space-time motion sensor for receiving the luminance signals to produce a space vertical motion sensing signal and a space horizontal motion sensing signal respectively as first and second sensing signals, a first threshold circuit for generating the logic state signals of the first sensing signal, a second threshold circuit for generating the logic state signals of the second sensing signal, first and second isolating point eliminators for eliminating logically isolating points of the outputs of the first and second threshold circuits to generate first and second adaptive control signals respectively, an adaptive control luminance filter for filtering the luminance signal to pass a given frequency region according to the first adaptive control signal, and an adaptive control chrominance filter for filtering the chrominance signal to pass a given frequency region according to the second adaptive control signal.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

The present invention will now be described with reference to the drawings attached only by way of example.

Figure 1:
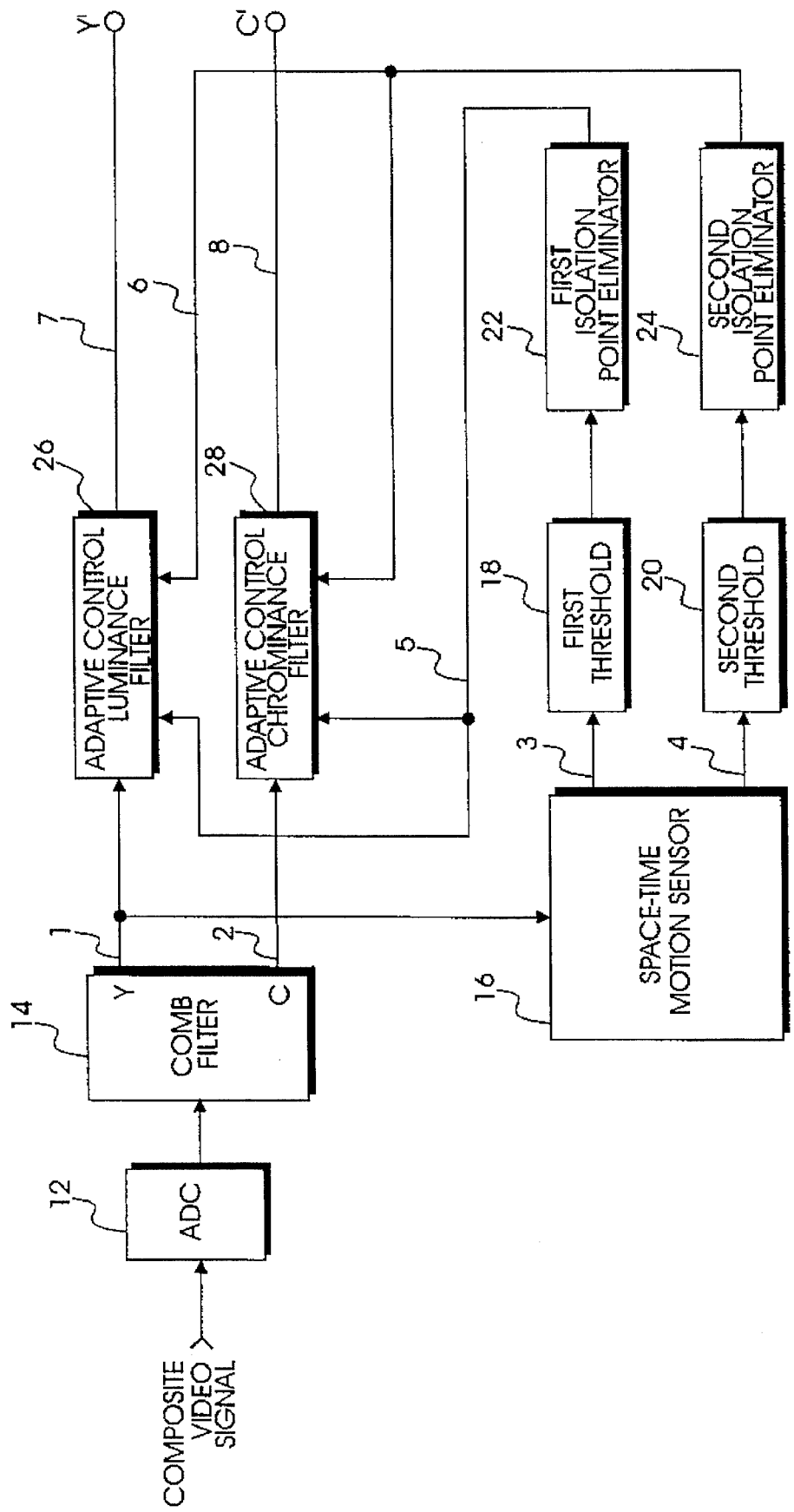
FIG. 1 is a block diagram illustrating an adaptive controlling video signal processing circuit according to the present invention.

Referring to FIG. 1, the composite video signals are converted into digital signals by an analog-to-digital converter (ADC) 12. A comb filter 14 separates the luminance signals Y and chrominance signals from the digitally converted composite video signals of the ADC 12. The luminance signals Y are received by a space-time motion sensor 16 to produce a space vertical motion sensing signal and a space horizontal motion sensing signal respectively as first and second sensing signals.

A first threshold circuit 18 generates logic state signals of the first sensing signal. A second threshold circuit 20 generates logic state signals of the second sensing signal. First and second isolation point eliminators 22 and 24 eliminate logically isolated points of the outputs of the first and second threshold circuits 18 and 20 to generate first and second adaptive control signals, respectively. An adaptive control luminance filter 26 filters the luminance signal Y to pass a given frequency region according to the first adaptive control signal. An adaptive control chrominance filter 28 filters the chrominance signal C to pass a given frequency region according to the second adaptive control signal.

Figure 2:
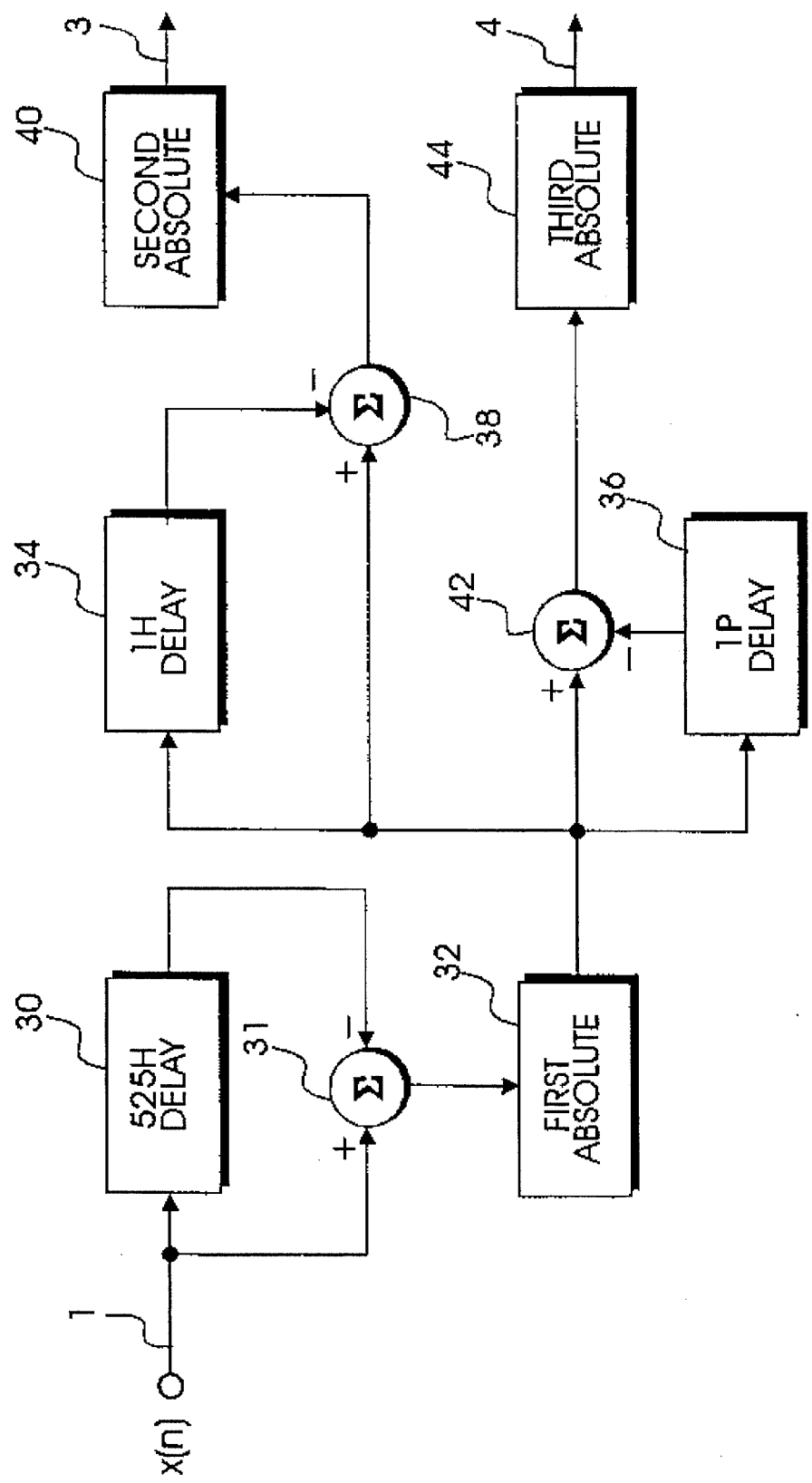
FIG. 2 is a block diagram illustrating the space-time motion sensor of FIG. 1.

Referring FIG. 2 schematizing the space-time motion sensor 16 of FIG. 1, the separated luminance signal Y is delayed by a one-frame delay circuit 30 during 525-H (horizontal scanning period). A first subtractor 31 subtracts the output signal of the one-frame delay circuit 30 from the present frame signal. A first absolute value circuit 32 generates the absolute value of the output signal of the first subtractor 31 to produce time motion signals. A 1-H delay circuit 34 delays the output of the first absolute value circuit 32 by 1-H and a 1-P delay circuit 36 delays the first output of the absolute value circuit 32 by one pixel-P. A second subtractor 38 subtracts the output of the 1-H delay circuit 34 from the output of the first absolute value circuit 32. A third subtractor 42 subtracts the output of the 1-P delay circuit 36 from the output of the first absolute value circuit 32. Second absolute value circuit 40 generates the absolute value of the output of the second subtractor 38 to produce a space vertical motion sensing signal. A third absolute value circuit 44 generates the absolute value of the output of the third subtractor 42 to produce a space horizontal motion sensing signal.

Figure 3:
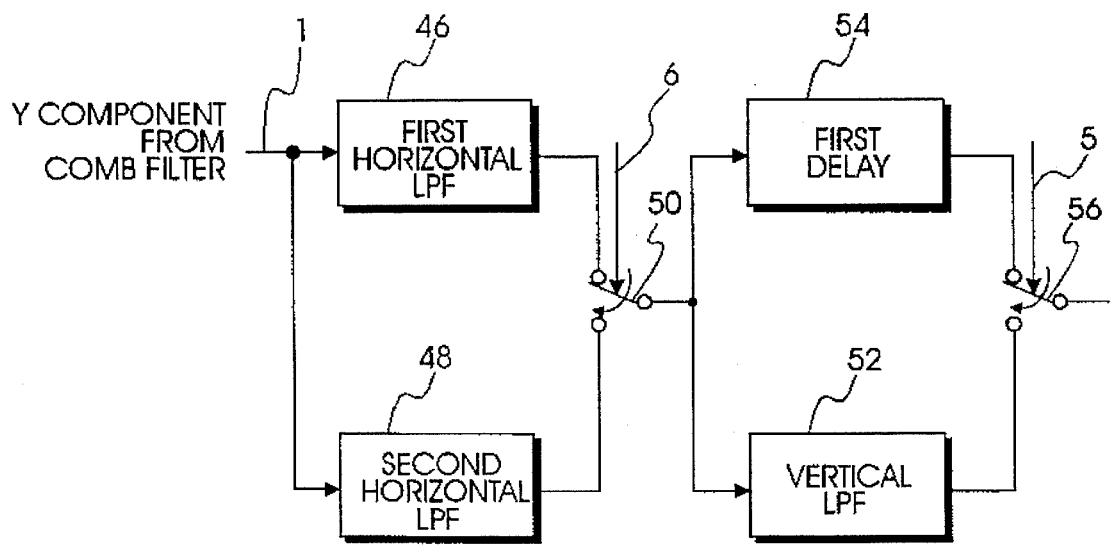
FIG. 3 is a block diagram illustrating the adaptive control luminance filter of FIG. 1.

Referring to FIG. 3 schematizing the adaptive control luminance filter 26 of FIG. 1, first and second horizontal low pass filters LPF 46 and 48 filter the luminance signal Y to respectively pass first and second given frequency regions. First delay circuit 54 delays the outputs of the first and second horizontal LPFs 46 and 48, while a vertical LPF 52 filters the outputs of the first and second horizontal LPFs 46 and 48. First switch 50 connects the outputs of the first and second horizontal LPFs 46 and 48 to the first delay circuit 54 and vertical LPF 52 according to the output of the third absolute value circuit 44. Second switch 56 provides the output of the first delay circuit 54 or vertical LPF 52 as an adaptive control luminance signal according to the output of the second absolute value circuit 40.

Figure 4:
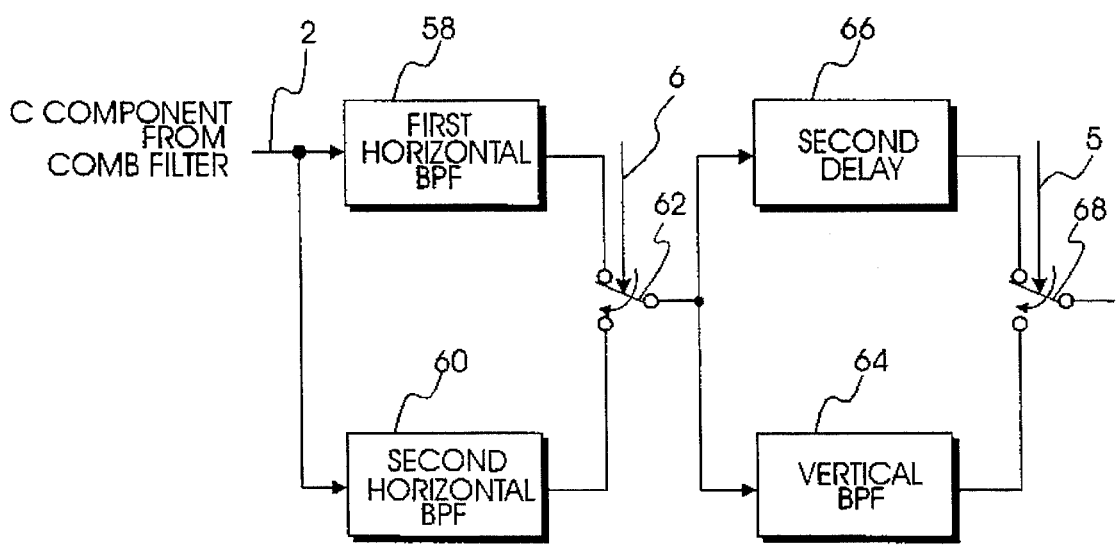
FIG. 4 is a block diagram illustrating the adaptive control chrominance filter of FIG. 1.

Referring to FIG. 4 schematizing the adaptive control chrominance filter 28 of FIG. 1, first and second horizontal band pass filters BPFs 58 and 60 filter the separated chrominance signal C to respectively pass first and second given frequency bands. Second delay circuit 66 delays the outputs of the first and second BPFs, while a vertical BPF 58 and 60 64 filters the outputs of the first and second BPFs 58 and 60. Third switch 62 connects the output of the first or second horizontal BPF 58 or 60 to the second delay circuit 66 and vertical BPF 64 according to the output of the third absolute value circuit 44. Fourth switch 68 provides the output of the second delay circuit 66 or vertical BPF 64 as an adaptive control chrominance signal according to the output of the second absolute value circuit 40.

Figure 5A:
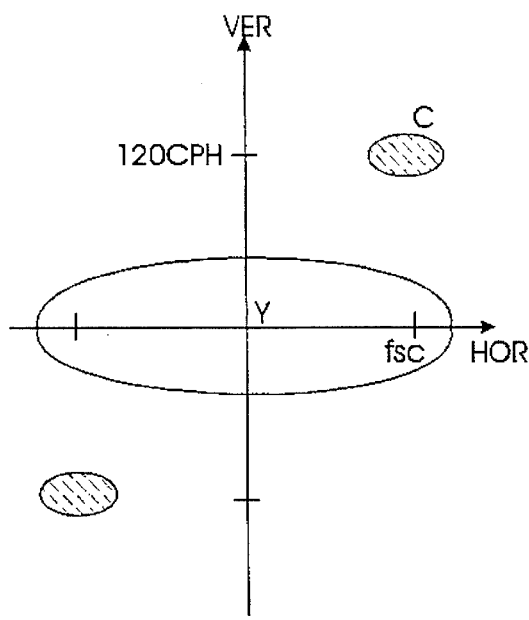
FIGS. 5A–5D shows the distribution of the frequency spectra of the composite video signal.
Figure 5B:
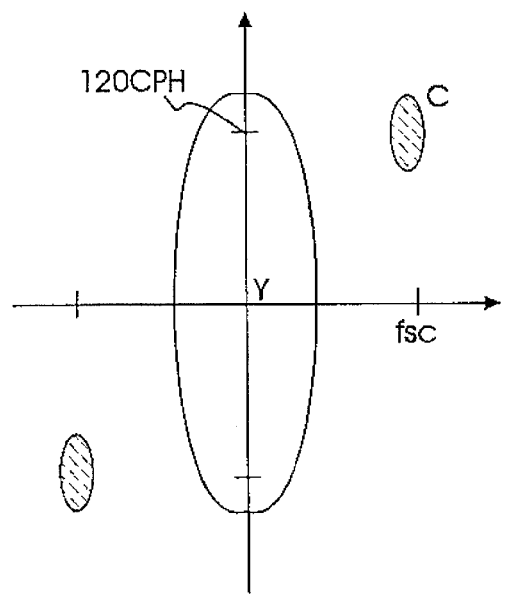
Figure 5C:
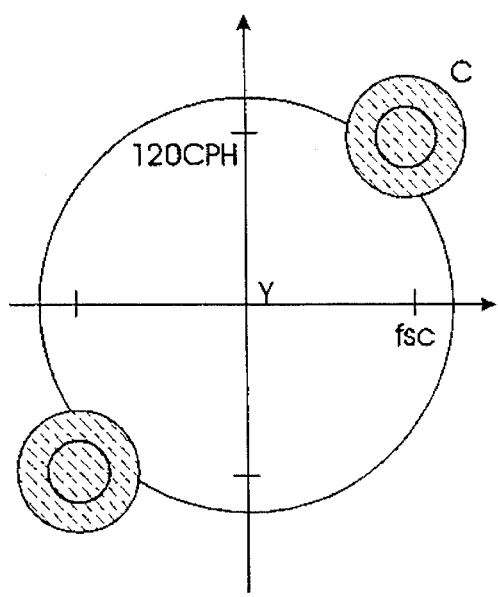
Figure 5D:
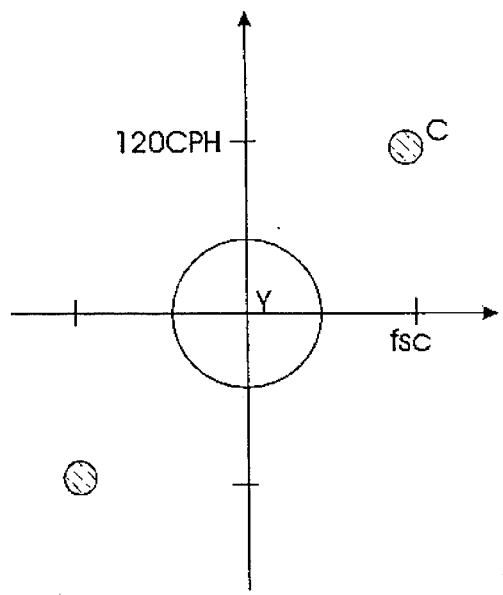

Referring to FIG. 5A-5D, FIG. 5A represents the case wherein the vertical motion is smaller than the horizontal motion, and the distribution of the spectra is horizontally extended. FIG. 5B represents the case wherein the vertical motion is greater than the horizontal motion, and the distribution of the spectra is extended vertically. FIG. 5C represents the case wherein the vertical and horizontal motions are all great, and the distribution of the spectra is extended both vertically and horizontally. FIG. 5D represents the case wherein the vertical and horizontal motions are all small or almost non-existent and the spectra are concentrated on the center.

In operation of the inventive circuit, the composite video signal is input into the ADC 12, thus converted into a digital signal which is input into the comb filter 14. The comb filter 14 separates the luminance signal Y and chrominance signal C from the digitally converted composite video signal, the luminance signal being input into the space-time motion sensor 16 constructed as shown in FIG. 2. In this case, the luminance signal Y is applied to the positive terminal of the first subtractor 31 and the one-frame delay circuit 30. The luminance signal Y delayed by one-frame through the one frame delay circuit 30 is input into the negative terminal of the first subtractor 31. The luminance signal difference between the present frame and preceding frame obtained by the first subtractor 31 is applied to the first absolute value circuit 32. Assuming that the value of the luminance signal Y is X(n), the output of the first subtractor 31 is given as the following formula (1).

$$X(n)-X(n-525H) \quad \ldots (1)$$

Hence, the absolute value of the first absolute circuit 32 is given as the following formula (2).

$$|X(n)-X(n-525H)| \quad \ldots (2)$$

Thus, the value of the formula (2) represents the motion sensing signal obtained by the difference between the present frame signal and just preceding frame, which indicates that the one-frame delay circuit 30, first subtractor 31 and first absolute circuit 32 construct a time-motion filter for sensing the time motions. The signal as shown by the formula (2) output from the time-motion filter is input into the 1-P delay circuit 34, second subtractor 38, 1-P (pixel) delay circuit 36, and third subtractor 42, so as to sense the horizontal and vertical motions.

The absolute value signal (time motion sensing signal) of the first absolute value circuit 32 is delayed by one-H through the 1-H delay circuit 34, applied to the negative terminal of the second subtractor 38, so that the second subtractor 38 provides into the second absolute circuit 40 the signal as shown by the following formula (3).

$$|X(n)-X(n-525H)|-|X(n-H)-X(n-526H)| \quad \ldots (3)$$

Also, the second absolute circuit 40 outputs the absolute value signal as shown by the following formula (4).

$$||X(n)-X(n-525H)|-|X(n-H)-X(n-526H)|| \quad \ldots (4)$$

Hence, the signal as shown by the formula (4) represents the motion sensing signal filtered vertically according to time, i.e. space-vertical motion sensing signal. The 1-P delay circuit 36 delays the input signal by one-P, and applies the delayed signal to the negative terminal of the third subtractor 42, which provides into the third absolute circuit 44 the subtracted signal as shown by the following formula (5).

$$|X(n)-X(n-525H)|-|X(n-P)-X(n-525H-p)| \quad \ldots (5)$$

Hence, the output signal of the third absolute circuit 44 is given as the following formula (6).

$$|X(n)-X(n-525H)|-|X(n-p)-X(n-525H-p)| \quad \ldots (6)$$

The signal as shown by the formula (6) is the signal sensed horizontally according to time, i.e. space-horizontal motion sensing signal. Thus, the space-time motion sensor 16 produces two outputs, one of which is the space-vertical motion sensing signal 3, and the other the space-horizontal motion sensing signal 4.

The two motion sensing signals are respectively input into the first and second threshold circuits 18 and 20 through output lines 3 and 4. Here, if the first and second threshold circuits 18 and 20 respectively detect the space-vertical motion sensing signal and space-horizontal sensing signal from the second and third absolute value circuit 40 and 44, they produce the logic state 1, or otherwise the logic state 0. The outputs of the first and second threshold circuits 18 and 20 are respectively applied to the first and second isolation point eliminators 22 and 24, whose operation is as described below.

If the outputs of the threshold circuits proceed in sequence as "11110001000" the logic state 1 between the logic states 0's is not regarded as a motion component, and is instead reset to 0. The reason that the isolated points are eliminated is to eliminate the motion component caused by noises, in view of the fact that the motion component does not occur at any particular point. Generally, the one point (pixel) represents external noises, which are eliminated. The outputs of the first and second isolation point eliminators 22 and 24, i.e., the space-vertical motion sensing signal and space-horizontal motion sensing signal are respectively applied as the adaptive control signals to the adaptive control luminance and chrominance filters 26 and 28. The filters 26 and 28 respectively receiving the luminance signal Y and chrominance signal C separated by the comb filter 14 are operated as described below.

The frequency distribution of the composite video signal containing the motion components is shown in FIGS. 5A-5D. For example, if the vertical motion is smaller than the horizontal motion, the frequency spectra are distributed as shown in FIG. 5A. In the case of FIG. 5A, the switches 56 and 68 of the adaptive control luminance and chrominance filters 26 and 28 are respectively connected to the vertical LPF 52 and the vertical BPF 64. Also, the switches 50 and 62 are respectively connected to the first horizontal LPF 46 and the first horizontal BPF 58. Hence, the luminance signal Y of the comb filter 14 is 4.2 MHz low-pass-filtered by the first horizontal LPF 46, and vertically low-pass-filtered, and vertically band-pass-filtered. Thus, the vertical motion signals of the frequency spectra as shown in FIG. 5A are filtered in a given frequency region, while the horizontal chrominance and luminance signals are preserved through the frequency regions.

In the case of FIG. 5B, the vertical motion is greater than the horizontal motion, the frequency distribution being extended vertically. Here, the switches 50 and 62 are respectively connected to the second horizontal LPF 48 and second horizontal BPF 60, while the switches 56 and 68 are respectively connected to the first delay circuit 54 and second delay circuit 66. Thus, the luminance signal Y of the comb filter 14 is filtered below 2 MHz by second horizontal LPF 48, the horizontal motion signal is somewhat limitedly filtered, delayed by the first delay circuit 54. The first delay circuit 54 does not filter the signal, but delays the input signal.

The chrominance signal C of the comb filter 14 is band-pass-filtered by the second BPF horizontal 60 of 3.1–4.2 MHz, delayed by the second delay circuit 66. Therefore, in the case of FIG. 5B, the frequencies of the horizontal luminance and chrominance signals are restricted, while the vertical luminance and chrominance signals are almost passed.

In the case of FIG. 5C, the frequency spectra of the composite video signal are broadly distributed both vertically and horizontally. Much crosstalk may occur in this case. The switches 50 and 62 are respectively connected to the output terminals of the second horizontal LPF 48 and first horizontal BPF 58, while the switches 56 and 68 are respectively connected to the vertical LPF 52 and vertical BPF 64. Hence, the frequency of the luminance signal Y output from the comb filter 14 is horizontally limited in the region of 2 MHz. Also, the chrominance signal C is horizontally band-pass-filtered in 2 MHz–4.2 MHz, and then, the vertical frequency thereof is band-pass-filtered in a given band. Thus, the frequency regions of both the chrominance signal C and the luminance signal Y are restricted.

In the case of FIG. 5D, both the vertical and horizontal motions of the composite video signal are small or almost do not exist. The frequency spectra of the luminance signal are concentrated in the center. Here, the switches 50 and 62 in FIGS. 3 and 4 are respectively connected to the output terminals of the first horizontal LPF 46 and first horizontal BPF 58, while the switches 56 and 68 are respectively connected to the output terminals of the first and second delay circuit 54 and 66. Thus, the luminance and chrominance signals Y and C separated by the comb filter 14 are filtered in 4.2 MHz of the NTSC region, so that the signals of the whole frequency region are all passed. Here, the switches 50, 62, 56 and 68 in FIGS. 3 and 4 are switched by the outputs of the first and second isolation point eliminators 22 and 24, which produce respectively the space-vertical motion sensing signal and space-horizontal motion sensing signal, whose logic is decoded to selectively switch. Thus, the luminance signal Y and chrominance signal C are filtered by adaptive controlling according to the space-vertical and space-horizontal motions of the input composite video signal to produce adaptive control luminance signal Y', and chrominance signal C' to minimize the crosstalk.

As described above, the inventive circuit detects the motions according to the space-time of the composite video signal to determine the region to pass the luminance signals and chrominance signals, so that the crosstalk between the luminance signal and chrominance signal caused by the frequencies is prevented, thereby improving the quality of the video signal.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. An adaptive controlling video signal processing circuit comprising:

analog-to-digital converter means for converting input composite video signals to composite digital signals;

comb filter means for separating a luminance signal and chrominance signals from said composite digital signals;

space-time motion sensor means for receiving said luminance signals to produce a space vertical motion sensing signal and a space horizontal motion sensing signal respectively as first and second sensing signals;

first threshold means for generating first logic state signals of said first sensing signal;

second threshold means for generating second logic state signals of said second sensing signal;

first and second isolating point eliminators for eliminating isolated points of said first and second logic state signals to provide first and second control signals, respectively;

adaptive control luminance filter means for filtering said luminance signal to pass said luminance signal within first given frequency regions according to said first and second control signals; and adaptive control chrominance filter means for filtering said chrominance signals to pass said chrominance signals within second given frequency regions according to said first and second control signals.

2. The adaptive controlling video signal processing circuit as claimed in claim 1, wherein said space-time motion sensor means comprises:

one-frame delay means for delaying said luminance signal by 525-horizontal lines to provide a frame delayed signal;

first subtractor means for subtracting said frame delayed signal from said luminance signal to provide a first subtracted signal;

first absolute value means for generating an absolute value of said first subtracted signal to provide a time motion signal;

one-horizontal line delay means for delaying said time motion signal by one-horizontal line to provide a line delayed signal;

one-pixel delay means for delaying said time motion signal by one-pixel to provide a pixel delayed signal;

second subtractor means for subtracting said line delayed signal from said time motion signal to provide a second subtracted signal;

third subtractor means for subtracting said pixel delayed signal from said time motion signal to provide a third subtracted signal;

second absolute value means for generating an absolute value of said second subtracted signal to provide said space vertical motion sensing signal; and third absolute value means for generating an absolute value of said third subtracted signal to provide said space horizontal motion sensing signal.

3. The adaptive controlling video signal processing circuit as claimed in claim 1, wherein said adaptive control luminance filter means comprises:

first and second horizontal low-pass filters having first and second predetermined bandwidths respectively, for filtering said luminance signal to provide first and second filtered signals;

means for selectively enabling transmission of one of said first and second filtered signals in dependence upon reception of said second control signal to provide a selected signal representative of one of said first and second filtered signals;

delay means for delaying said selected signal for a predetermined time period to provide a delayed signal;

a vertical low pass filter having a third predetermined bandwidth, for filtering said selected signal to provide a third filtered signal; and means for selectively enabling transmission of one of said delayed signal and said third filtered signal in dependence upon reception of said first control signal to provide an adaptive controlled signal.

4. The adaptive controlling video signal processing circuit as claimed in claim 1, wherein said adaptive control chrominance filter means comprises:

first and second horizontal band pass filters having first and second predetermined bandwidths respectively, for filtering said chrominance signal to provide first and second filtered signals;

means for selectively enabling transmission of one of said first and second filtered signals in dependence upon reception of said second control signal to provide selected signals representative of one of said first and second filtered signals;

delay means for delaying said selected signals for a predetermined time period to provide delayed signals;

a vertical band-pass filter having a third predetermined bandwidth, for filtering said selected signals to provide third filtered signals; and means for selectively enabling transmission of one of said delayed signals and said third filtered signal in dependence upon reception of said first control signal to provide adaptive controlled signals.

5. A process for adaptively controlling composite video signals, comprising:

receiving input composite video signals;

separating luminance signals and chrominance signals from the composite video signals;

converting luminance signals into a space vertical motion sensing signal and a space horizontal motion sensing signal, wherein the space vertical motion sensing signal and the space horizontal motion sensing signal are designated as first and second sensing signals, respectively;

generating first logic state signals of said first sensing signal;

generating second logic state signals of said second sensing signal;

eliminating isolated points of the first and second logic state signals to generate first and second control signals, respectively;

filtering said luminance signals within first given frequency regions according to said first and second control signals to provide adaptive controlled luminance signals; and filtering said chrominance signals within second given frequency regions according to said first and second control signals to provide adaptive controlled signals.

6. An adaptive composite video signal controller, comprising:

means for converting analog composite video signals to digital composite video signals;

means for separating luminance signals and chrominance signals from the digital composite video signals; and motion detector means for detecting space vertical motion and space horizontal motion of said luminance signals to provide space vertical motion sensing signals and space horizontal motion sensing signals corresponding to the detected vertical and horizontal motion of said luminance signals; and means for adaptively filtering the separated luminance signals and chrominance signals at selected frequency bandwidths according to the output of said motion detector means.

7. The adaptive composite video signal controller as claimed in claim 6, further comprising:

first threshold means for generating logic state signals of said space vertical motion sensing signals;

second threshold means for generating logic state signals of said space horizontal motion sensing signals; and means for eliminating isolated points of the logic state signals of said space vertical motion sensing and logic state signals of said space horizontal motion sensing signals to generate said first and second control signals, respectively.

8. An adaptive composite video signal controller, comprising:

means for converting analog composite video signals to digital composite video signals;

means for separating luminance signals and chrominance signals from the digital composite video signals;

means for detecting space vertical motion and space horizontal motion from said luminance signals to provide space vertical motion sensing signals and space horizontal motion sensing signals corresponding to the detected vertical and horizontal motion of said luminance signals;

first threshold means for generating logic state signals of said space vertical motion sensing signals;

second threshold means for generating logic state signals of said space horizontal motion sensing signals;

means for eliminating isolated points of the outputs of said first and second threshold means to generate first and second control signals, respectively;

means for filtering said luminance signals within first given frequency regions according to said first and second control signals; and means for filtering said chrominance signals within second given frequency regions according to said first and second control signals.

9. The adaptive composite video signal controller as claimed in claim 6, wherein said motion detector means comprises:

means for delaying said luminance signals by one frame;

first subtractor means for subtracting the output signal of said delaying means from the current luminance frame signals;

first absolute value means for generating the absolute value of the output signal of the first subtractor means to produce time motion signals;

means for delaying the output of the first absolute value means by one horizontal line;

means for delaying the output of the first absolute value means by one pixel;

second subtractor means for subtracting the output of the one horizontal line delaying means from the output of the first absolute value means;

third subtractor means for subtracting the output of the one pixel delaying means from the output of the first absolute value means;

second absolute value means for generating the absolute value of the output of the second subtractor means to produce said space vertical motion sensing signals; and third absolute value means for generating the absolute value of the output of the third subtractor means to produce said space horizontal motion sensing signals.

10. The adaptive composite video signal controller as claimed in claim 8, wherein said luminance signals filtering means comprises:

a first low-pass filter for horizontally cutting off the luminance signals at a first frequency;

a second low-pass filter for horizontally cutting off the luminance signals at a second frequency;

means for delaying the output of one the first and second low-pass filters;

a vertical low-pass filter for vertically filtering the output of one the first and second low-pass filters;

first switching means for enabling connection of one of the output of the first low-pass filter and the second low pass filter to the delaying means and the vertical low-pass filter in response to the second control signal; and second switching means for enabling transmission of one of the output of the delaying means and the vertical low pass filter in response to the first control signal.

11. The adaptive composite video signal controller as claimed in claim 8, wherein said chrominance signals filtering means comprises:

a first band-pass filter for horizontally passing the chrominance signals at a first frequency band;

a second band-pass filter for horizontally passing the chrominance signals at a second frequency band;

means for delaying the output of one of the first and second band-pass filters;

a vertical band-pass filter for vertically filtering the output of one of the first and second band-pass filters;

first switching means for enabling connection of one of the output of the first band-pass filter and the second band-pass filter to the delaying means and the vertical band-pass filter in response to the second control signal; and second switching means for enabling transmission of one of the output of the delaying means and the vertical band-pass filter in response to the first control signal.

12. The adaptive composite video signal controller as claimed in claim 7, wherein said motion detector means comprises:

means for delaying said luminance signals by one frame;

first subtractor means for subtracting the output signal of said delaying means from the current luminance frame signal;

first absolute value means for generating the absolute value of the output signal of the first subtractor means to produce time motion signals;

means for delaying the output of the first absolute value means by one horizontal line;

means for delaying the output of the first absolute value means by one pixel;

second subtractor means for subtracting the output of the one horizontal line delaying means from the output of the first absolute value means;

third subtractor means for subtracting the output of the one Pixel delaying means from the output of the first absolute value means;

second absolute value means for generating an absolute value of the output of the second subtractor means to produce space vertical motion sensing signals; and third absolute value means for generating the absolute value of the output of the third subtractor means to produce space horizontal motion sensing signals.

13. The adaptive composite video signal controller as claimed in claim 8, wherein said motion detector means comprises:

means for delaying said luminance signals by one frame;

first subtractor means for subtracting the output signal of said delaying means from the current luminance signals;

first absolute value means for generating the absolute value of the output signal of the first subtractor means to produce time motion signals;

means for delaying the output of the first absolute value means by one horizontal line;

means for delaying the output of the first absolute value means by one pixel;

second subtractor means for subtracting the output of the one horizontal line delaying means from the output of the first absolute value means;

third subtractor means for subtracting the output of the one pixel delaying means from the output of the first absolute value means;

second absolute value means for generating the absolute value of the output of the second subtractor means to produce space vertical motion sensing signals; and third absolute value means for generating the absolute value of the output of the third subtractor means to produce space horizontal motion sensing signals.

* * * * *